United States Patent
Martel et al.

(10) Patent No.: US 7,398,623 B2
(45) Date of Patent: Jul. 15, 2008

(54) DECK BOARD FASTENER WITH CONCAVE PRONGS

(75) Inventors: David J. Martel, Harwinton, CT (US); David Young Hartmann, Bristol, CT (US)

(73) Assignee: Tiger Claw, Inc., Bristol, CT (US)

( * ) Notice: Subject to any disclaimer, the term of this patent is extended or adjusted under 35 U.S.C. 154(b) by 407 days.

(21) Appl. No.: 10/922,686

(22) Filed: Aug. 20, 2004

(65) Prior Publication Data
US 2005/0252154 A1 Nov. 17, 2005

Related U.S. Application Data

(63) Continuation-in-part of application No. 10/844,246, filed on May 12, 2004, now abandoned.

(51) Int. Cl.
*E04B 2/30* (2006.01)
*E04B 1/38* (2006.01)
*E04C 1/40* (2006.01)
*E04C 5/00* (2006.01)
*F16B 15/00* (2006.01)

(52) U.S. Cl. ............... 52/489.2; 52/489.1; 52/480; 52/509; 52/512; 52/715; 411/461; 411/493

(58) Field of Classification Search .......... 248/218.4, 248/219.1, 219.3, 219.4, 300, 499, 680, 911, 248/230.1, 220.1, 220.21, 223.41; 411/458, 411/459, 470, 920, 461, 466, 493, 921; 52/712, 52/715, 489.2, 489.1, 582.1, 586.1, 586.2, 52/480, 578, 483.1, 509, 512; 403/231, 232.1
See application file for complete search history.

(56) References Cited

U.S. PATENT DOCUMENTS 876,399 A * 1/1908 Robinson ............... 52/714
1,879,459 A * 9/1932 Pelton ................... 403/217
2,065,525 A * 12/1936 Hamilton ............... 411/460

(Continued)

OTHER PUBLICATIONS

Tiger Claw Hidden Deck Fasteners [online]. Tiger Claw Inc. Retrieved from the Internet Archive Wayback Machine <URL: http://web.archive.org/web/20030810145836/http:www.deckfastener.com/products.htm.

(Continued)

*Primary Examiner*—Robert Canfield
*Assistant Examiner*—Hunter M Dreidame
(74) *Attorney, Agent, or Firm*—McCormick, Paulding & Huber LLP

(57) ABSTRACT

According to the present invention, a fastener for securing a first board to an underlying supporting member and to at least one other board running adjacent and parallel to the first board. The fastener includes a body portion, first and second prongs, and a flange. The first prong extends outwardly from the body portion for driving into a first board. The second prong extends outwardly from the body portion for penetrating a second board. The body portion of the fastener includes an opening for receiving a connector. When installed, the connector passes through the opening in the body portion and into the supporting member, which supports and underlies the first and second boards. The flange extends outwardly from the body portion in order to maintain a desired gap between the first and second boards. The prongs may have concave insertion ends as defined by two spaced-apart insertion points.

20 Claims, 3 Drawing Sheets

U.S. PATENT DOCUMENTS

| | | | | |
|---|---|---|---|---|
| 2,066,813 | A * | 1/1937 | Williams | 411/458 |
| 2,116,737 | A * | 5/1938 | Urbain | 52/489.2 |
| 2,129,975 | A * | 9/1938 | Urbain | 52/489.2 |
| 2,200,649 | A * | 5/1940 | Wardle | 52/489.2 |
| 2,214,939 | A | 9/1940 | Stirn | |
| 2,270,284 | A * | 1/1942 | Faggard | 411/473 |
| 2,325,766 | A * | 8/1943 | Gisondi | 52/489.2 |
| 2,338,870 | A * | 1/1944 | Praeger | 52/582.1 |
| 2,620,705 | A | 12/1952 | Podvinecz et al. | |
| 2,779,979 | A * | 2/1957 | Sundelin et al. | 52/479 |
| 2,848,758 | A * | 8/1958 | Chisholm | 52/364 |
| 3,020,602 | A * | 2/1962 | Siering | 52/714 |
| 3,500,604 | A * | 3/1970 | Vandall | 52/489.1 |
| 3,553,919 | A * | 1/1971 | Omholt | 52/506.1 |
| 3,577,694 | A * | 5/1971 | Omholt | 52/506.1 |
| 3,619,963 | A * | 11/1971 | Omholt | 52/481.1 |
| 4,052,831 | A | 10/1977 | Roberts et al. | |
| 4,117,644 | A * | 10/1978 | Weinar | 52/714 |
| 4,281,494 | A * | 8/1981 | Weinar | 52/489.2 |
| 4,296,580 | A * | 10/1981 | Weinar | 52/281 |
| 4,333,286 | A * | 6/1982 | Weinar | 52/281 |
| 4,448,007 | A * | 5/1984 | Adams | 52/489.2 |
| 4,467,579 | A * | 8/1984 | Weinar | 52/281 |
| 4,498,272 | A * | 2/1985 | Adams | 52/714 |
| 4,598,518 | A | 7/1986 | Hohmann | |
| 4,616,462 | A * | 10/1986 | Abendroth | 52/509 |
| 4,620,403 | A * | 11/1986 | Field | 52/480 |
| 4,621,473 | A * | 11/1986 | Wendt | 52/489.2 |
| 4,703,601 | A * | 11/1987 | Abendroth | 52/509 |
| 4,831,808 | A * | 5/1989 | Wynar | 52/715 |
| 4,925,141 | A * | 5/1990 | Classen | 248/217.2 |
| D312,772 | S * | 12/1990 | Paul | D8/389 |
| 5,027,573 | A * | 7/1991 | Commins et al. | 52/489.2 |
| 5,390,457 | A * | 2/1995 | Sjolander | 52/387 |
| 5,408,796 | A * | 4/1995 | Hashimoto et al. | 52/489.2 |
| 5,642,597 | A * | 7/1997 | Hendrickson | 52/715 |
| 5,694,730 | A * | 12/1997 | Del Rincon et al. | 52/586.1 |
| 5,738,473 | A | 4/1998 | Tebo | 411/460 |
| 5,842,319 | A | 12/1998 | Ravetto | |
| 5,927,923 | A * | 7/1999 | Tebo | 411/458 |
| 5,997,209 | A * | 12/1999 | Sachs | 403/388 |
| 6,071,054 | A | 6/2000 | Tebo | |
| 6,237,295 | B1 * | 5/2001 | Ballard | 52/589.1 |
| 6,266,937 | B1 * | 7/2001 | Watanabe | 52/489.2 |
| 6,279,286 | B1 * | 8/2001 | Ichihashi | 52/489.1 |
| 6,299,400 | B1 * | 10/2001 | Tebo | 411/459 |
| 6,416,269 | B1 * | 7/2002 | Martel et al. | 411/461 |
| 6,490,838 | B2 * | 12/2002 | Summerford | 52/650.3 |
| 6,497,395 | B1 * | 12/2002 | Croker | 248/300 |
| 6,540,432 | B2 * | 4/2003 | Albanese | 403/388 |
| 6,766,992 | B1 * | 7/2004 | Parker | 248/300 |
| 6,810,633 | B2 * | 11/2004 | Harris, Sr. | 52/489.2 |
| 7,251,918 | B2 * | 8/2007 | Reif et al. | 52/714 |
| 2001/0015042 | A1 * | 8/2001 | Ballard | 52/589.1 |
| 2003/0121226 | A1 * | 7/2003 | Bolduc | 52/391 |

OTHER PUBLICATIONS

Canadian Office Action dated Aug. 21, 2007.
Tiger Claw Inc., TC-3 Fastener, Nov. 14, 2006, http://www.deckfastener.com/products_tc3.asp.
Tiger Claw Inc., TC-X Fasteners, May 11, 2003, http://web.archive.org/web/20030621061553/www.deckfastener.com/products.htm.
Tiger Claw Inc., TC-3 Fastener, May 11, 2003, http://web.archive.org/web/20030621101925/www.deckfastener.com/TC-3.htm.

* cited by examiner

DECK BOARD FASTENER WITH CONCAVE PRONGS

This is a continuation-in-part of U.S. patent application Ser. No. 10/844,246, filed May 12, 2004 now abandoned.

FIELD OF THE INVENTION

The invention concerns a deck fastener for securing deck boards together and to a supporting member, and deals more particularly with a deck fastener that does not protrude from the deck surface.

BACKGROUND OF THE INVENTION

Brackets, clips, and anchors for securing boards to joists without nail or screw heads protruding from the deck surface are known. However, some of these deck-fastening systems require securing devices that are difficult to install or require extensive preparation. For example, some deck fastening systems require pre-installing tracks on joists, pre-drilling slots or holes in boards for fasteners, or gluing the boards to the joists. Other deck fastening systems must be installed from below the deck, a time consuming, expensive, and sometimes impossible procedure.

While these deck-fastening systems are designed to prevent nails or screws from appearing on the deck surface, many of the parts of the systems are quite apparent from beneath the deck. Since a deck is often located over a cellar entrance or off a second floor, the underside of such a deck is also in view. Therefore, the display of protruding fasteners and/or other components is unsightly and possibly dangerous.

Since deck boards are subject to warping, splitting and shrinking, some of the known deck fastener systems do not prevent the deck boards from separating from the support joists over time. The fasteners also can come loose or become out of position on the joists. The separating of the boards from the joists may allow the boards to protrude above the deck surface, making the deck unsightly and less usable.

Some deck-fastening systems include prongs that are inserted into the boards. However, wide prongs have been found to have a tendency to split the deck board material, especially when the deck board material is a composite material. In addition, thermal expansion and contraction of the boards has caused damage to the deck boards, the support member and/or the deck fastener.

The object of the present invention is, therefore, to provide an improved deck fastener which, among other desirable attributes, significantly reduces or overcomes the above-mentioned deficiencies of prior deck fasteners.

SUMMARY OF THE INVENTION

According to the present invention, a fastener for securing a first board to an underlying supporting member and to at least one other board running adjacent and parallel to the first board includes a thin, flat body portion, a first prong, a second prong, and a flange. The flat body portion has a front face and a rear face, with the first prong extending outwardly from the front face of the body portion for driving into the first board. The second prong extends outwardly from the rear face of the body portion for penetrating the second board. The second prong runs adjacent, parallel to, and in a direction opposite from that of the first prong. The second prong includes a tab. The tab extends outward from the rear face of the thin flat body portion a distance. The flange also extends outward from the rear face of the thin flat body portion substantially the same distance as the tab. The body portion of the fastener has an opening for receiving a connector. In operation, the first prong is inserted in the first board at a location where the first board traverses the underlying support member. The connector is passed through the opening of the body portion at an angle and inserted into the underlying support member. A head portion of the connector engages the body portion of the fastener around the opening, holding the fastener in place. The second board is then positioned over the support member, parallel and adjacent to the first board. The second board is driven onto the second prongs, which extend outwardly from the rear face of the body portion. Thus, the second board is secured to the body portion and the first board.

Another feature of the invention is the approximately conical shape of the opening so that a head of the connector, such as a screw, can be partially inserted within the opening to reduce the amount of screw head protruding from the opening and thereby permit a close positioning of adjoining boards.

For aiding insertion into the boards, the prongs may have wedge-shaped ends, or they may have concave ends (formed by two short penetration points), depending on the particular board material.

Other features and advantages of the invention will be apparent from the following detailed description of various preferred embodiments of the invention, and from the accompanying drawings and claims.

DETAILED DESCRIPTION OF THE PREFERRED EMBODIMENTS

Figure 1:
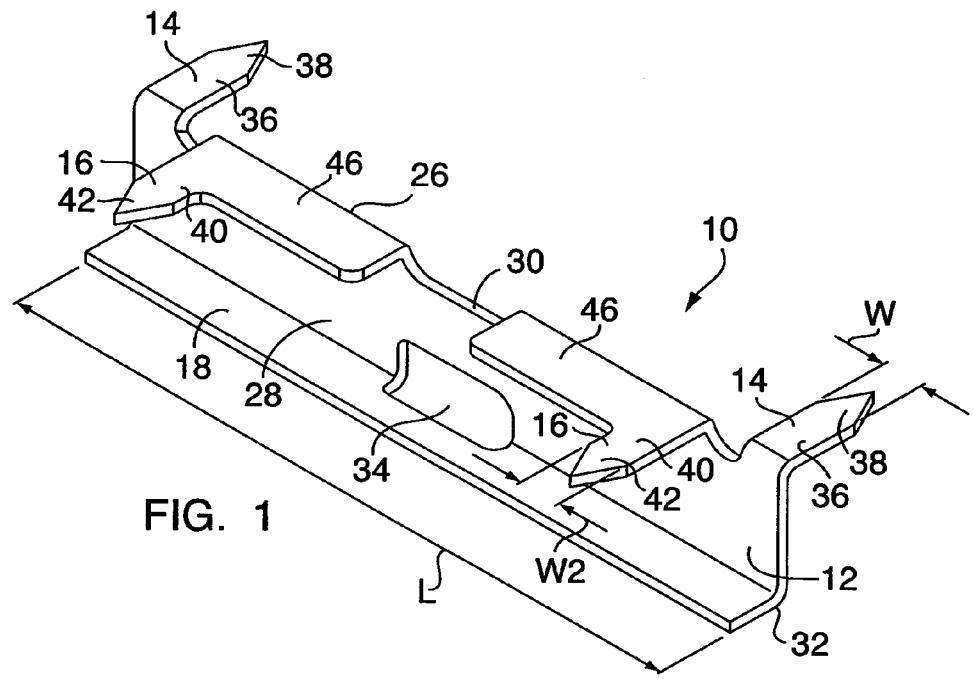
FIG. 1 is a perspective view of a deck fastener embodying the present invention.
Figure 2:
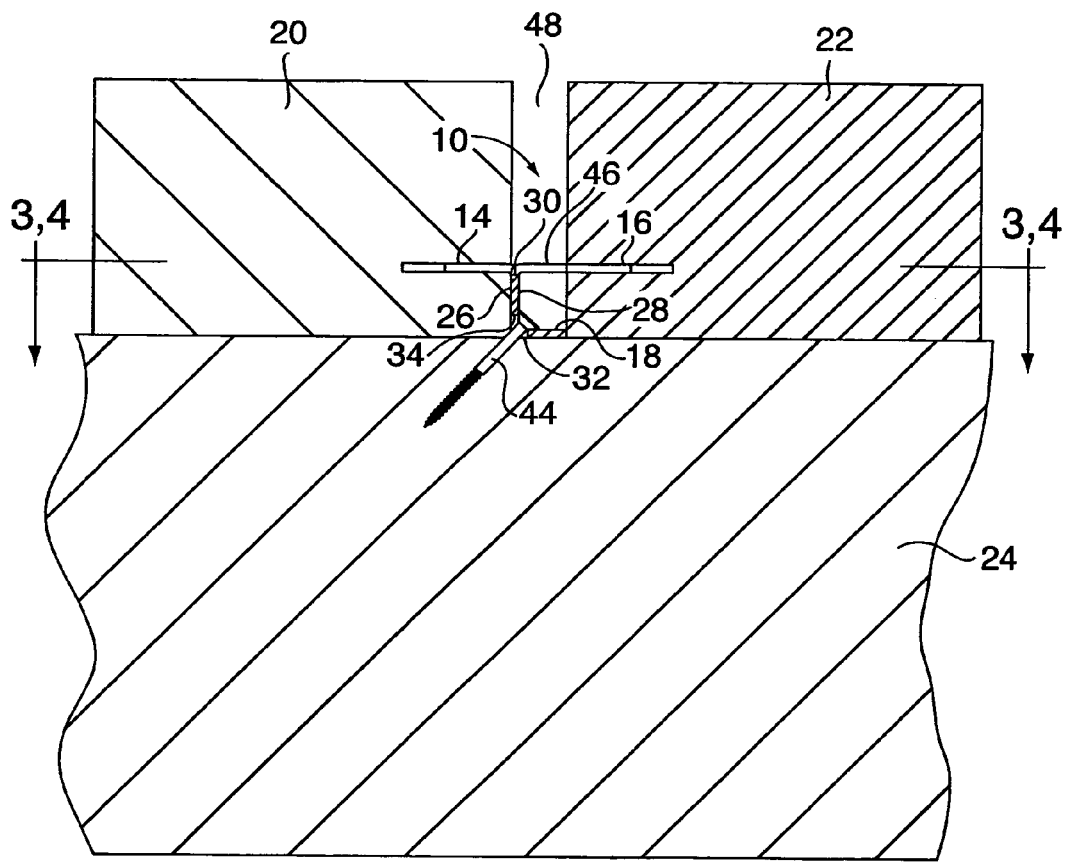
FIG. 2 is a sectional view of the deck fastener of FIG. 1 retaining a first deck board and a second deck board to a support member.

Referring to FIGS. 1 and 2, the fastener 10 of the present invention includes a thin, flat body portion 12, at least one first prong 14, at least one second prong 16, and a flange 18. The fastener 10 is operable to secure a first deck board 20 and a second deck board 22 together and to a support member 24.

Preferably, the fastener 10 is made of any suitable type of cut and bent sheet metal. In some embodiments, the fastener 10 is made from 0.06" half-hardened steel that is rolled and not heat-treated. In other embodiments, the fastener 10 is made from 0.06" 304 stainless steel that is quarter roll-hardened. The fastener may also be made from 0.03" 420 or 440 stainless steel. Other materials and gauges are possible. Preferably, the fastener 10 is coated in order to hide the body portion 12 in the shadows created in the gap (discussed below and identified in FIG. 2 as "48") between the adjoining deck boards 20, 22. In some embodiments, the fastener 10 is coated in a black oxide coating. In other embodiments, the coating can be a black phosphorous electric "e" coat HV3 oil finish for additional corrosion resistance.

The body portion 12 has a front face 26, a rear face 28, a top edge 30, a bottom edge 32, and an opening 34. The body portion 12 preferably has a length "L" of about 2⅛" long and a height "H" of 0.5."

The first prongs 14 extend outwardly from the front face 26 of the body portion 12 for being driven into and penetrating a first board 20 for securing the first board 20 to the body portion 12. Preferably, there are two first prongs 14 that are approximately parallel to each other and approximately perpendicular to the body portion 12. The first prongs 14 each include a first portion 36 and a second portion 38, the first portion 36 being generally rectangular in shape and the second portion 38 being wedge-shaped, as shown in FIG. 1. The first portion 36 of each of the first prongs is contiguous to the top edge 30 of the body portion 12 and the second portion 38 is contiguous with the first portion 36 of the first prong 14. In some embodiments, the first prong(s) 14 extend outwardly approximately ½" from the body portion 12 and the first portion 36 has a width ("W") that is approximately 3/16" wide. The first prong(s) 14 have non-tapered edges for penetrating the material of the first deck board 20, such as a composite material.

The two first prongs 14 are preferably spaced approximately 1 15/16" apart on the body portion 12. While two first prongs 14 have been shown and described, the present invention is not so limited. For example, embodiments of the present invention may include only a single first prong 14, or, alternatively, may include three or more first prongs 12, without departing from the broader aspects of the present invention. In addition, the size of the first prongs 14 may vary. Wider or narrower, or longer or shorter first prongs 14 may be used, as well, depending on the needs and wants of the end user.

Referring to FIGS. 1 and 2, the second prongs 16 extend outwardly from the top edge 30 of the rear face 28 of the body portion 12 for driving into a second deck board 22. Preferably, there are two (2) second prongs 16 that are approximately parallel to each other and approximately perpendicular to the body portion 12. The second prongs 16 run adjacent, parallel to, and in a direction opposite that of the first prongs 14. In some embodiments, each of the second prongs 16 includes a first portion 40 and a second portion 42, the first portion 40 being rectangular in shape and the second portion 42 being wedge-shaped. The first portion 40 of each second prong 16 is contiguous to the top edge 30 of the body portion 12 and the second portion 42 is contiguous with the first portion 40 of the second prong 16. Preferably, the second prongs 16, like the first prongs 14, extend outwardly approximately ½" from the body portion 12 and the first portion 14 of each second prong 16 has a width ("W2") that is approximately 3/16" wide. The second prongs 16 have non-tapered edges for penetrating the material of the second deck board 22, such as a composite material.

Preferably, the two second prongs 16 are spaced approximately 1 5/16" apart on the body portion 12. While two second prongs 16 have been shown and described, the present invention is not so limited, as there may be only a single second prong 16, or three or more second prongs 16, without departing from the broader aspects of the present invention.

Optionally, the body portion 12 includes one or more tabs 46. In some embodiments, the tab(s) 46 extend outwardly from the body portion 12 approximately ⅛" in a direction parallel to the second prongs 16. Typically, the tabs 46 are connected to the second prongs 16 and extend at least partially between the second prongs 16, as shown, for example, in FIG. 1. However, in some embodiments, the tabs 46 may be separated from the second prongs 16.

Referring now to FIGS. 1 and 2, at least one flange 18 extends outwardly approximately ⅛" from the bottom edge 32 of the rear face 28 of the body portion 12. In some embodiments, a single flange 18 may run the entire length "L" of the body portion 12, as shown in FIG. 1. In other embodiments, one or more flanges 18 may run a portion of the length "L" of the body portion 12. The flange(s) 18 and/or the tab(s) 46 are operable to create an initial gap 48 of approximately 3/16" to ¼" between the first deck board 20 and the second deck board 22 during installation. However, the gap 48 tends to widen slightly over time due to board shrinkage.

Continuing to refer to FIGS. 1 and 2, the body portion 12 includes an opening 34 for passing a connector 44, such as a screw. The opening is approximately centered lengthwise on the body portion 12. The connector 44 is operable to fasten the body portion 12 to the support member 24 (e.g., a joist). The opening 34 is preferably an elongated aperture in order to accommodate for linear expansion and contraction of the first and/or second deck boards 20, 22. In some embodiments, such as the one shown in FIG. 1, the opening 34 may have one or more rounded ends. In some embodiments, the opening 34 extends at least partially onto the flange 18, thereby permitting the head of an inclined screw to partially fit through the opening 34. Accordingly, in these embodiments, the amount of screw head protruding from the rear face 28 of the body portion 12 when secured is reduced. However, the opening 34 is also typically sized to prevent the head of the connector 44 from completely passing through the body portion 12. The reduction in connector 44 head protrusion prevents the screw head from undesirably widening the initial gap 48 between the first deck board 20 and the second deck board 22.

Referring to FIG. 2, the body portion 12 having the opening 34 permits the body portion 12 to grasp a shank of the connector 44 and fasten the body portion 12 to the support member 24. The connector 44 is preferably a 1⅝" or 2" galvanized or stainless steel deck screw, having a no. 6 or 8 thickness and a course thread; however, any suitable connector is acceptable. The screw is inclined at about a 45-degree angle to the body portion 12 during insertion. As the screw is inserted, it passes through the body portion 12, the first board 20, and into the support member 24. While a screw has been shown and described, the present invention is not so limited, as other connectors 44 and fasteners which can connect the body portion 12 of the fastener 10 to the support member 24, such as a nail, can be employed without departing from the broader aspects of the invention.

Figure 3:
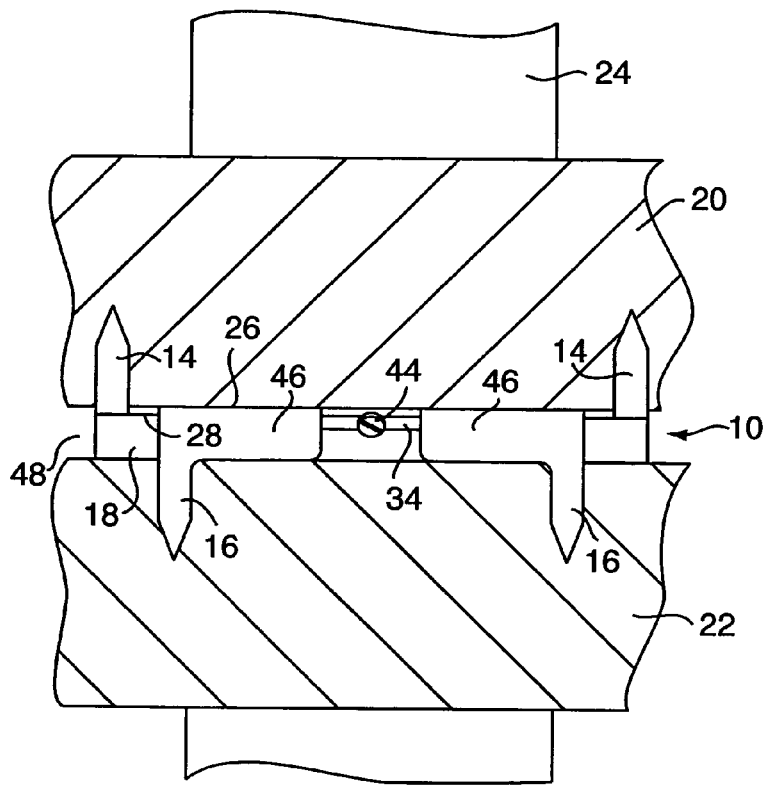
FIG. 3 is fragmentary sectional view of FIG. 2 along line 3-3 showing the deck fastener of FIG. 1 retaining two boards to a support member with a fastening connector.
Figure 4:
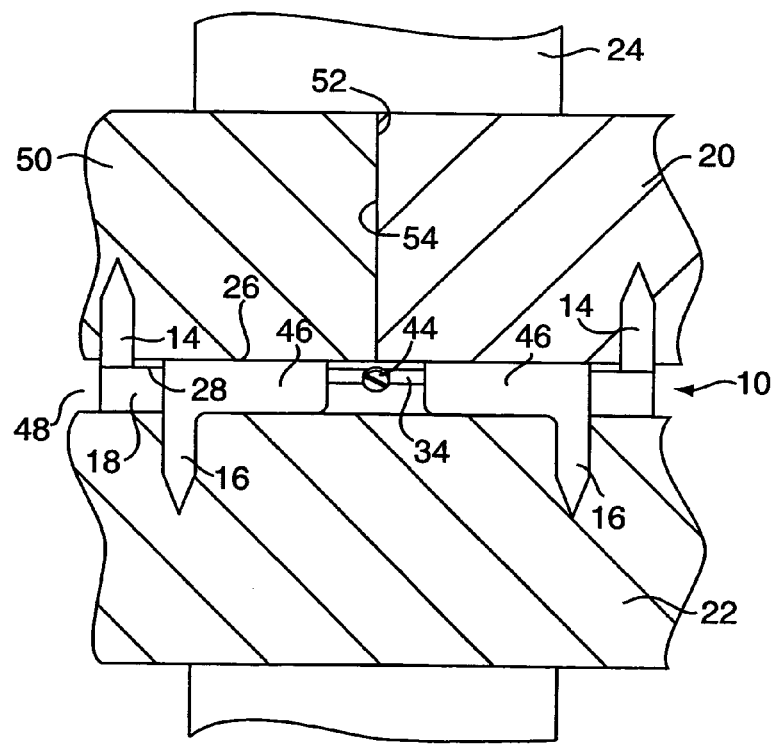
FIG. 4 is a fragmentary sectional view of FIG. 2 along line 4-4 showing the deck fastener of FIG. 1 retaining a first board to a second and third boards at their respective ends.

Referring to FIGS. 2, 3 and 4, in operation, the first prongs 14 are driven into the first deck board 20. In some embodiments, an installation tool (not shown) is used to drive the first prongs 14 into the first deck board 20. The installation tool is typically shaped to accommodate the second prongs 16 and flange 18 of the fastener 10. The second side of the installation tool is typically substantially flat to provide a broad surface on which to strike the installation tool, thereby driving the first prongs 14 into the first deck board 20. The first deck board 20 is secured to the support member (e.g., joist) with the connector 44 at the location where the first board 20 overlaps, crosses, or is supported by the support member 24. The support member 24 is shown perpendicular to the body portion 12 and the first and second boards 20, 22. However, the present invention is not so limited, as the fastener 10 may also be employed with deck boards 20, 22 laid diagonally over the joist, without departing from the broader aspects of the present invention.

As shown in FIG. 2, the body portion 12 of the fastener 10 is centered on the support member 24 with the first deck board 20 crossing the support member 24. The body portion 12 is parallel to the first deck board 20 and the front face 26 of the body portion 12 facing the first board 20. The connector 44 is inserted in the opening 34 in the body portion 12 at approximately a 45 degree incline and passes through the body portion 12. In some embodiments, the connector 44 then passes through the first board 20 and into the underlying supporting member 24, thereby drawing the body portion 12 against the support member 24. In other embodiments, the connector 44 may pass through the body portion 12 and directly into the underlying support member 24.

Continuing with FIG. 3, the second board 22 is then positioned over the support member 24, parallel and adjacent to the first board 20. The second board 22 is driven onto the second prongs 16, which extend outwardly from the rear face 28 of the body portion 12. Thus, the second board 22 is secured to the body portion 12 and the first board 20.

As shown in FIG. 4, sometimes a width of a deck is larger than the length of boards 20, 22 used in building the deck, so it is necessary to position and secure two boards 20, 50, such as the first board 20 and a third board 50, together at their end sections 52, 54. To secure the end sections 52, 54 of the boards 20, 50 together, the end sections 52, 54 of the boards 20, 50 are positioned adjacent to each other over the support member 24. The above-described procedure is repeated, ensuring that at least one prong is driven into each of the first, second and third boards 20, 22, 50, thereby securing all of the boards 20, 22, 50 to each other and to the support member 24.

Figure 5:
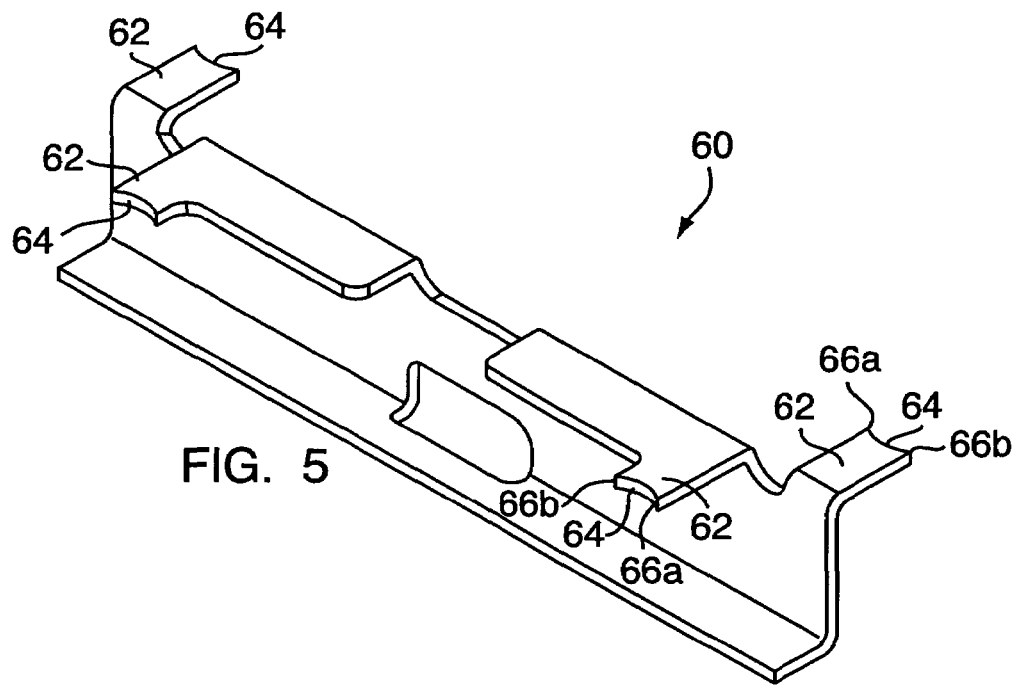
FIG. 5 is a perspective view of another deck fastener embodying the present invention.

FIG. 5 shows an alternative embodiment of the fastener 10. Here, a fastener 60 is generally similar in overall shape and function to the fastener 10. However, instead of having first and second prongs 14, 16 with wedge-shaped second portions 38, 42, respectively, the fastener 60 has concave prongs 62. More particularly, each concave prong 62 is generally rectangular in overall shape, but has a slight concavity 64 in the insertion end of the prong 62. The slight concavity 64 results in two spaced-apart insertion points 66a, 66b positioned on the left and right sides of the end of the prong 62. In use, the insertion points 66a, 66b start the deck board penetration, while the outer edges of the prongs 62 cut the wood grain. In such a manner, the concave end 64 has proven useful for improving cross-grain penetration, relieving wedging effects, and reducing splitting for certain types of very dense deck materials, e.g., ironwood, mahogany, and ipê (a Brazilian hardwood).

Figure 6A:
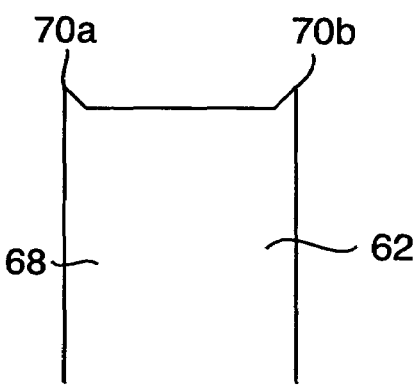
FIGS. 6A-6C are alternative embodiments of the deck fastener shown in FIG. 5.
Figure 6B:
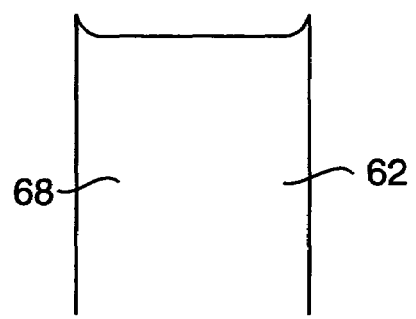
Figure 6C:
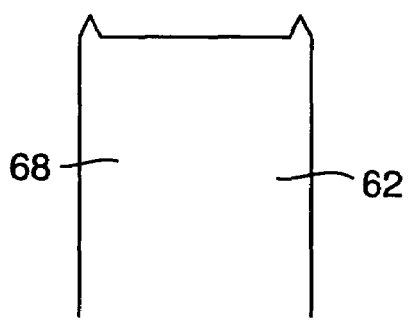

Turning to FIG. 6A, instead of a rounded concavity 64 (e.g., a concave surface as defined by an osculatory circle or radius of curvature), the concave prong 62 could comprise a rectangular portion 68 and two small, triangular points or protuberances 70a, 70b. The triangular points 70a, 70b would be located at the left and right sides of the insertion end of the prong 62, and would together define the prong concavity 64. Similar configurations are also possible, e.g., curved points (FIG. 6B) or wedge-shaped points (FIG. 6C), as long as some sort of concave end is defined.

It should be understood that the foregoing description is only illustrative of the invention. Various alternatives and modifications can be devised by those skilled in the art without departing from the broader aspects of the present invention.

What is claimed is:

1. A fastener usable with a connector for securing a first decking member to an underlying supporting member and to at least a second decking member running adjacent and parallel to the first decking member, said fastener comprising:

a flat body portion having front and rear faces and top and bottom edges, said top and bottom edges defining vertical limits of the body portion and the body portion extending vertically between said top and bottom edges;

a first prong extending outwardly from said front face of said body portion for driving into a first decking member;

a second prong extending outwardly from the rear face of said body portion for penetrating a second decking member, said second prong running adjacent and parallel to and in a direction opposite from that of said first prong; and a flange extending outwardly from said rear face of said body portion, said flange creating a gap between the first and second decking members when secured together;

wherein at least one of the first prong and the second prong has a concave insertion end defined by two spaced-apart insertion points; and wherein at least one of said flange and said body portion defines an opening capable of receiving an elongated connector inserted through said opening with said connector being inclined to and passing through said at least one of the flange and the body portion for fastening the fastener to a supporting member that supports and underlies the first and second decking members.

2. The fastener of claim 1, wherein both the first prong and the second prong have concave insertion ends.

3. The fastener of claim 1, wherein:

the flange extends outwardly from the rear face of the body portion in the direction of the second prong, said flange extending beyond a thickness of the flat body portion for creating a gap between the first and second decking members when secured together by the fastener, wherein the gap is wider than the thickness of the flat body portion.

4. The fastener of claim 3, wherein said first prong is one of two such first prongs spaced horizontally from one another, and wherein said second prong is one of two such second prongs spaced horizontally from one another, said first prongs and said second prongs extending perpendicular to the body portion.

5. The fastener of claim 4, wherein said first prongs and said second prongs all have concave insertion ends.

6. The fastener of claim 3, wherein the flange comprises a flat member lying generally perpendicular to the fastener body portion, said flat member being attached to the bottom edge of the fastener body portion and having a width oriented generally perpendicularly to the rear face of the flat body portion and a thickness extending in a direction normal to the bottom edge of the flat body portion, said width being greater than the thickness of the flat member.

7. The fastener of claim 1, wherein:

said opening is elongated in order to allow movement of a connector relative to the fastener due to expansion and contraction of the first and second decking members.

8. The fastener of claim 1, wherein the concave insertion end is a rounded concave insertion end as defined by a radius of curvature.

9. A deck fastener for securing a first decking member to an underlying supporting member and to at least a second decking member running adjacent and parallel to the first decking member, said fastener comprising:

a flat body portion having front and rear faces and top and bottom edges;

a first prong extending outwardly from said front face of said body portion;

a second prong extending outwardly from the rear face of said body portion, said second prong running in a direction opposite from that of said first prong; and a flange extending outwardly from said rear face of said body portion in the direction of the second prong, wherein the flange extends beyond a thickness of the flat body portion for creating a gap between the first and second decking members when secured together by the fastener, said gap being wider than the thickness of the flat body portion;

wherein at least one of said flange and said body portion defines an opening capable of receiving an elongated connector inserted through said opening.

10. The deck fastener of claim 9, wherein at least one of the first prong and the second prong has a concave insertion end.

11. The deck fastener of claim 10, further comprising:

a third prong extending outwardly from the rear face of said body portion, said third prong running parallel to and in the same direction as the second prong and in a direction opposite from that of said first prong, wherein the second and third prongs are spaced apart from one another; and a fourth prong extending outwardly from said front face of said body portion and running parallel to and in the same direction as the first prong and in a direction opposite from that of the second and third prongs, wherein the fourth prong is spaced apart from the first and second prongs;

wherein the first, second, third and fourth prongs have concave insertion ends.

12. The deck fastener of claim 11, wherein the concave insertion ends are rounded concave insertion ends as defined by radii of curvature.

13. The deck fastener of claim 9, wherein the flange comprises a flat member extending generally perpendicularly outwardly from said rear face of said body portion only in the direction of the second prong, said flat member being attached to the bottom edge of the flat body portion and having a width generally perpendicular to the rear face of the body portion and a thickness extending in a direction normal to the bottom edge of the flat body portion, said width being greater than the thickness of the flat member.

14. A deck fastener for securing a first decking member to an underlying support member and to at least a second decking member running adjacent and parallel to the first decking member, said fastener comprising:

a flat body portion having front and rear faces and top and bottom edges, said top and bottom edges defining vertical limits of the body portion and the body portion extending vertically between said top and bottom edges;

first and second prongs connected to the top edge of the body portion and extending generally perpendicularly outwardly from the front face of said body portion, wherein the first and second prongs are spaced apart from one another and are located at generally opposite ends of the body portion;

third and fourth prongs connected to the top edge of the body portion and extending generally perpendicularly outwardly from the rear face of said body portion, wherein the third and fourth prongs run parallel to and in a direction opposite from that of said first and second prongs, and wherein the third and fourth prongs are spaced apart from one another and are located at generally opposite ends of the body portion; and a flange connected to the bottom edge of the body portion and extending outwardly from the rear face of said body portion in the direction of the third and fourth prongs, wherein the flange extends beyond a thickness of the flat body portion for creating a gap between the first and second decking members when secured to the underlying support member by the fastener, said gap being wider than the thickness of the flat body portion;

wherein at least one of the flange and the body portion defines an opening capable of receiving an elongated connector inserted through said opening, with said connector being inclined to and passing through said at least one of the flange and the body portion for connecting said deck fastener to a support member that supports and underlies the first and second decking members.

15. The deck fastener of claim 14 wherein the first, second, third, and fourth prongs have concave insertion ends.

16. The deck fastener of claim 15, wherein the concave insertion ends are rounded concave insertion ends as defined by radii of curvature.

17. The deck fastener of claim 14 further comprising:

at least one tab connected to the top edge of the body portion, said at least one tab extending generally perpendicularly outwardly from the rear face of the body portion in the direction of the flange, wherein the at least one tab is parallel to the flange and extends generally the same distance beyond the thickness of the flat body portion as the flange.

18. The deck fastener of claim 14 wherein the flange and the body portion together define the connector opening, said opening extending through the body portion proximate the bottom edge thereof and through the flange proximate where the flange is connected to the body portion.

19. The deck fastener of claim 14, wherein the flange comprises a flat member having a width generally perpendicular to the rear face of the flat body portion and a thickness extending in a direction normal to the bottom edge of the flat body portion, said width being greater than said thickness for establishing the gap between the first and second decking members while maintaining the entirety of the flange in dose proximity to the support member.

20. A fastener usable with a connector for securing a first decking member to an underlying support member and to at least a second decking member running adjacent and parallel to the first decking member, said fastener comprising:

a flat body portion having front and rear faces and top and bottom edges, said top and bottom edges defining vertical limits of the body portion and the body portion extending vertically between said top and bottom edges;

a first prong extending outwardly from said front face of said body portion for driving into a first decking member;

a second prong extending outwardly from the rear face of said body portion for penetrating a second decking member, said second prong running adjacent and parallel to and in a direction opposite from that of said first prong; and a flange extending outwardly from said rear face of said body portion in the direction of said second prong, said flange extending past a thickness of the flat body portion for creating a gap between the first and second decking members when secured together by the fastener to a supporting member that supports and underlies the first and second decking members, said gap being wider than the thickness of the flat body portion;

wherein at least one of said body portion and said flange define an opening capable of receiving an elongated connector inserted through said opening for connecting the fastener to the supporting member.

* * * * *